F. W. WIESEBROCK.
Apparatus for Purifying the Air in Brewers' Cellars.
No. 231,129. Patented Aug. 10, 1880.
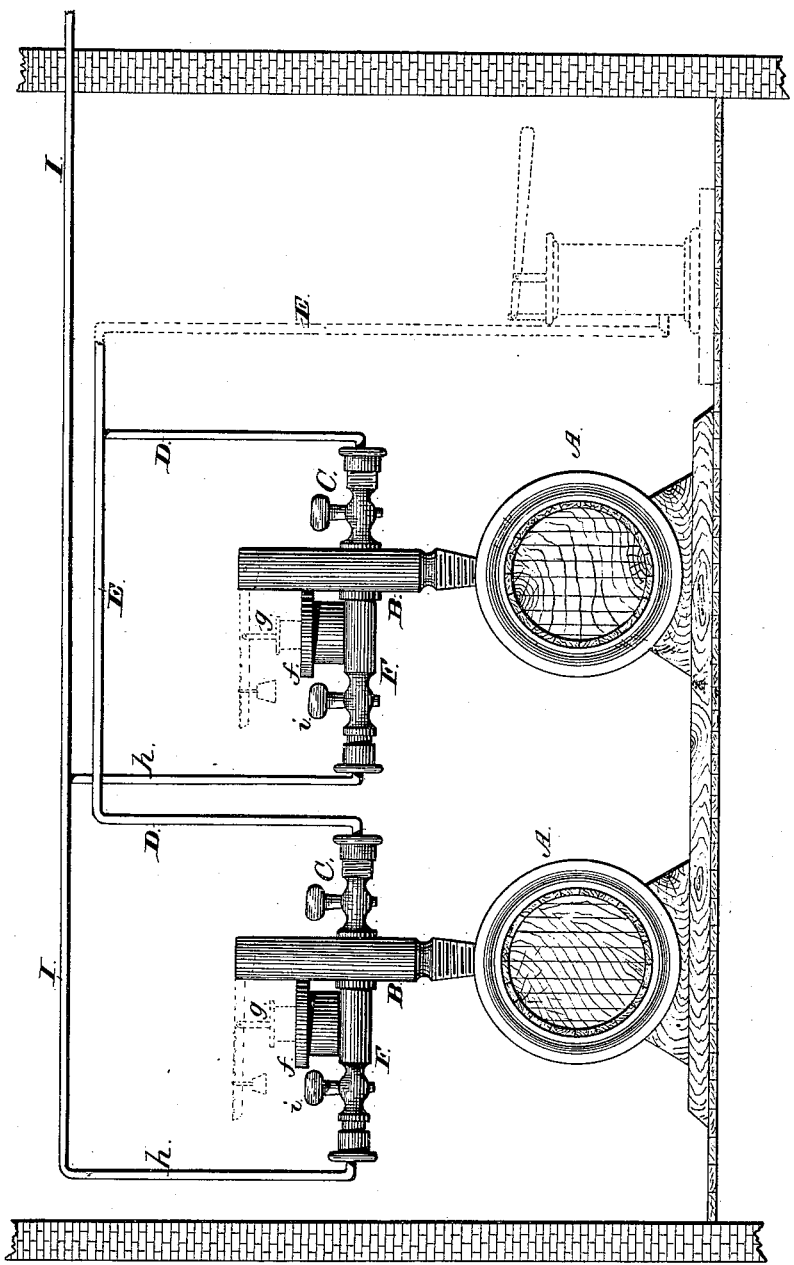

UNITED STATES PATENT OFFICE.

FREDERICK W. WIESEBROCK, OF NEW YORK, N. Y.

APPARATUS FOR PURIFYING THE AIR IN BREWERS' CELLARS.

SPECIFICATION forming part of Letters Patent No. 231,129, dated August 10, 1880.

Application filed February 19, 1880.

*To all whom it may concern:*

Be it known that I, FREDERICK W. WIESE-BROCK, a citizen of the United States, residing at New York city, in the county of New York and State of New York, have invented new and useful Improvements in Apparatus for Regulating the Temperature and Purifying the Air in Brewers' Cellars, of which the following is a specification.

This invention has for its object to prevent contamination of the air and variation of the temperature thereof in ripening or fermenting cellars or chambers of breweries by the mixture therewith of the air which has been used to exert a pressure upon the beer for racking it off from the said ripening or fermenting casks. It has the further object to permit the beer from any number less than the whole of a series of casks connected by pipes during the process of ripening to be racked off, and the air and gas discharged from said casks or cask outside of the cellar or chamber in which they are located, without disturbing the pressure in the other casks or cask.

Heretofore, when the beer was ready to be transferred from the shavings-cask to the kegs or other vessels for the retailer or consumer, said shavings-cask has been connected by a hose with an air-pump, and a pressure of from ten to twenty-five pounds per square inch produced upon the surface of the beer, thus forcing it from the cask to the smaller vessel through a suitable racking-off pipe. After all of the beer desired has been racked off the compressed air has been allowed to escape from the shavings-cask directly into the cellar or other chamber in which said cask has been located, and as the air in such cellar or chamber is required to be maintained at a low and as nearly as possible uniform temperature, in order that fermentation in the shavings-casks shall properly proceed, it is obvious that the sudden discharges into said chamber or cellar of large quantities of compressed air from the shavings-casks, having a higher temperature, will cause a variation of the temperature of the cellar or chamber, which will be greatly disadvantageous to the process of fermentation.

Furthermore, the compressed air, after having been used for racking off the beer, is highly charged with carbonic gas from the beer, and is very injurious to the health of workmen in the cellar or other chamber, and besides causes the germination of fungi and other low-grade vegetation, which is detrimental to the casks and other implements and the walls.

From the above it will be seen that it is of great importance that the air used in racking off the beer and all surplus carbonic-acid gas shall after use be conducted from the shavings-casks to a point of discharge outside of the cellar or other chamber where the said casks are located.

By my invention this object is accomplished, the air of the ripening or fermenting cellar or chamber maintained in a wholesome condition, and at a temperature conducive to the proper fermentation of the beer.

To this end the invention consists in the combination, with one or more air-pressure regulators constructed for application to single casks, substantially as hereinafter described, and each provided with separate induction and eduction ports or pipes governed by suitable cocks, and an air-pipe leading from the former for connection to an apparatus for producing air pressures of one or more discharge-pipes connected to the eduction port or ports of said regulator or regulators, and arranged to lead outside the cellar or chamber in which the cask or casks may be located.

The drawing illustrates a series of shavings or fermenting casks having my invention applied thereto.

The letters A A indicate the shavings or fermenting casks, each of which is provided with a pressure-regulator, B, which I prefer to construct according to the invention described and shown in Letters Patent granted to me November 18, 1879. From the cock C of each of the pressure-regulators a branch pipe, D, provided with a cock, *d*, leads to a main air-pipe, E, and this main pipe E connects with an air pump or vessel containing compressed air. The branch pipe F of the pressure-regulator is connected to the chamber *f*, containing the valve connected by a suitable stem, *g*, with a weighted lever, or it may be to a spring or its equivalent, and to the top of the vertical tubular portion of the regulator may be connected a suitable pressure-gage. This branch pipe F, beyond the valve, is provided with a cock, *i*, and this branch F of each of the regulators in a series is connected by a pipe, h, with a main air-discharge pipe, I, which leads outside of the cellar or other chamber where the shavings-casks A are located.

When the beer is ready to be racked off the regulator is adjusted to permit the desired amount of pressure, and the air-pump is set in motion, or air is permitted to flow from a reservoir of compressed air through the main air-charging pipe E and its branches D to the pressure-regulators, and thence into the casks, as described in my patent before referred to, the cocks i meanwhile being kept closed. Then the racking off can commence, and after the beer from any cask is discharged the cock C should be closed, the cock i opened, and the valve of the pressure-regulator relieved of the pressure of its weight or spring and opened. The air which has been used for forcing the beer from the cask then flows from said cask through the pressure-regulator, branch pipe h, and main air-discharge pipe I, to the open air outside the cellar or other chamber in which the casks are located.

Any other kind of pressure-regulator may be used than that described in my said patent before referred to, and its air induction and eduction pipes connected respectively with the branch pipes D and h.

It will be understood that the beer may be racked off from several casks at the same time, if desired, by properly adjusting the inlet and outlet cocks of the regulator.

What I claim is—

1. The combination, with one or more air-pressure regulators, substantially as described, for connection to shavings-casks, and each provided with separate induction and eduction ports or pipes governed by suitable cocks, and an air-pipe leading from the former for connection to an apparatus for producing air-pressure, of one or more discharge-pipes connected to the eduction port or ports of said regulator or regulators, and leading outside the cellar or chamber in which the cask or casks may be located, substantially as described, and for the purpose set forth.

2. The combination, with the casks A, located in a cellar or other chamber, of the pressure-regulators fitted to said casks, the induction branch pipes D, connecting said regulators and casks with the main air-charging pipe E, the branch pipes h, connecting the eduction-pipes of said regulators with the main air-discharge pipe I, leading outside the cellar or chamber, and the cocks C and i, controlling the induction and eduction of the regulators respectively, substantially as described.

In testimony whereof I have hereunto set my hand in the presence of two subscribing witnesses.

FREDERICK W. WIESEBROCK.

Witnesses:
BRUNO B. MINCHO,
EUGENE P. MEDANICH.